us011660793B2

(12) United States Patent
Kurita et al.

(10) Patent No.: US 11,660,793 B2
(45) Date of Patent: May 30, 2023

(54) CONDUCTIVE MEMBER MODULE, AND PRODUCTION METHOD THEREFOR

(71) Applicant: DENSO CORPORATION, Kariya (JP)

(72) Inventors: Akifumi Kurita, Kariya (JP); Yohei Yoshimura, Kariya (JP); Ryota Tanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/592,830

(22) Filed: Feb. 4, 2022

(65) Prior Publication Data

US 2022/0152895 A1 May 19, 2022

Related U.S. Application Data

(60) Division of application No. 16/866,293, filed on May 4, 2020, now Pat. No. 11,524,434, which is a continuation of application No. PCT/JP2018/040940, filed on Nov. 5, 2018.

(30) Foreign Application Priority Data

Nov. 6, 2017 (JP) .............................. JP2017-214116

(51) Int. Cl.
  *B29C 45/16* (2006.01)
  *B29C 45/26* (2006.01)
(52) U.S. Cl.
  CPC .......... *B29C 45/2608* (2013.01); *B29C 45/16* (2013.01); *B29C 2045/169* (2013.01)
(58) Field of Classification Search
  CPC combination set(s) only.
  See application file for complete search history.

(56) References Cited

U.S. PATENT DOCUMENTS

| 6,527,989 B1 | 3/2003 | Onoda |
| 2003/0173482 A1* | 9/2003 | Kuhn .................. F16M 13/027 248/276.1 |
| 2003/0173842 A1 | 9/2003 | Kobayashi et al. |
| 2004/0189127 A1 | 9/2004 | Kobayashi et al. |

(Continued)

FOREIGN PATENT DOCUMENTS

| JP | 2003134724 A | 5/2003 |
| JP | 2011035277 A | 2/2011 |

(Continued)

OTHER PUBLICATIONS

Doc. No. 201188406, Ctry JP.

(Continued)

*Primary Examiner* — Alison L Hindenlang
*Assistant Examiner* — Debjani Roy
(74) *Attorney, Agent, or Firm* — Harness, Dickey & Pierce, P.L.C.

(57) ABSTRACT

A conductive member module has a pair of conductive members formed in a plate shape and facing each other, and a sealing part for sealing the pair of conductive members. The conductive member module is produced by performing an accommodation step, a sealing step, and an extraction step. In the sealing step, the conductive members are sealed with a resin injected into a die while a force is applied by the resin to the individual conductive members in directions to approach each other in a facing orientation of the pair of conductive members.

2 Claims, 18 Drawing Sheets

(56) References Cited

U.S. PATENT DOCUMENTS

| | | | |
|---|---|---|---|
| 2011/0143111 A1* | 6/2011 | Yamamoto | B29C 45/14467 |
| | | | 264/261 |
| 2020/0262115 A1* | 8/2020 | Kurita | H01R 13/52 |
| 2020/0262119 A1 | 8/2020 | Kurita et al. | |

FOREIGN PATENT DOCUMENTS

| | | |
|---|---|---|
| JP | 201188406 A | 5/2011 |
| JP | 2011143711 A | 7/2011 |

OTHER PUBLICATIONS

Doc. No. 2011143711, Ctry JP.
Doc. No. 2003134724, Ctry JP.
Doc. No. 2011035277, Ctry JP.
U.S. Appl. No. 16/866,293, filed May 4, 2020, Inventor Akifumi Kurita.

* cited by examiner

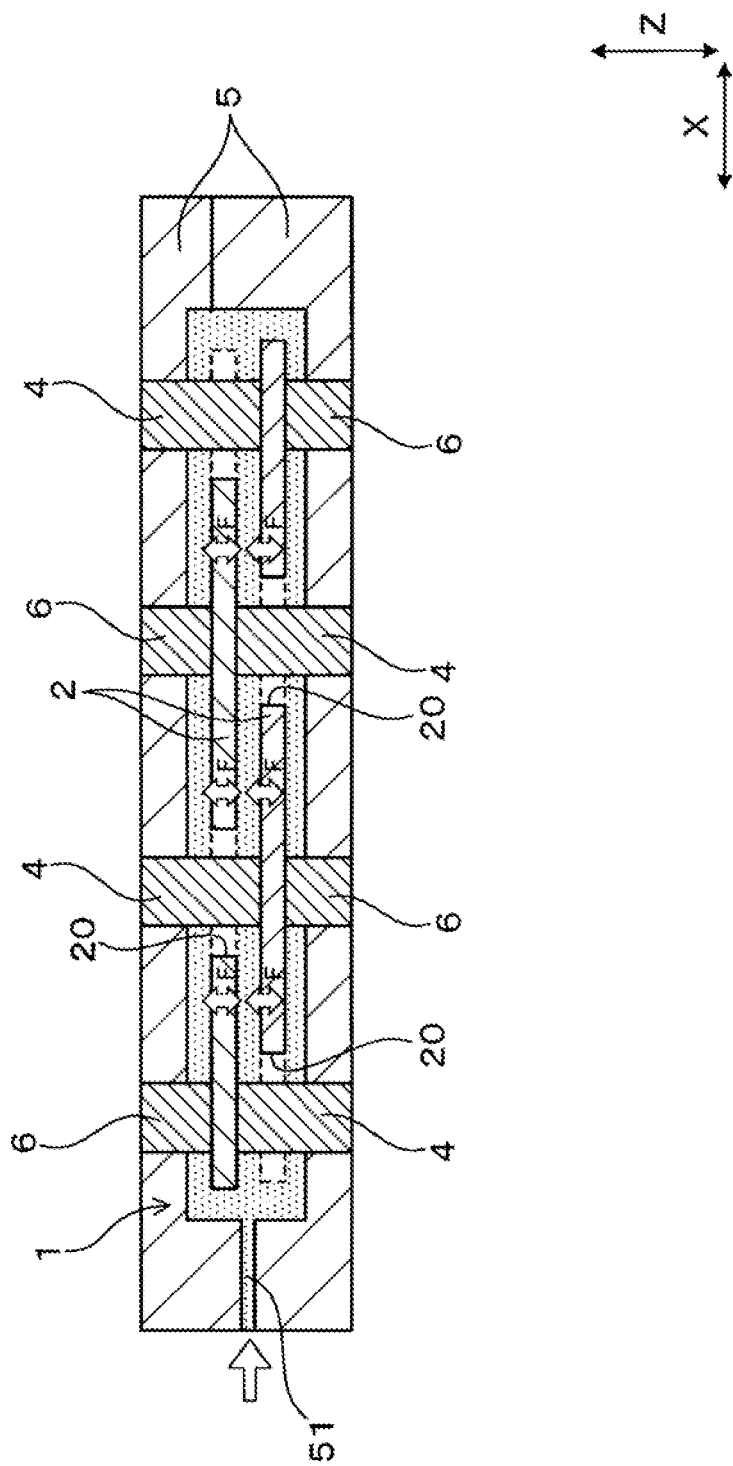

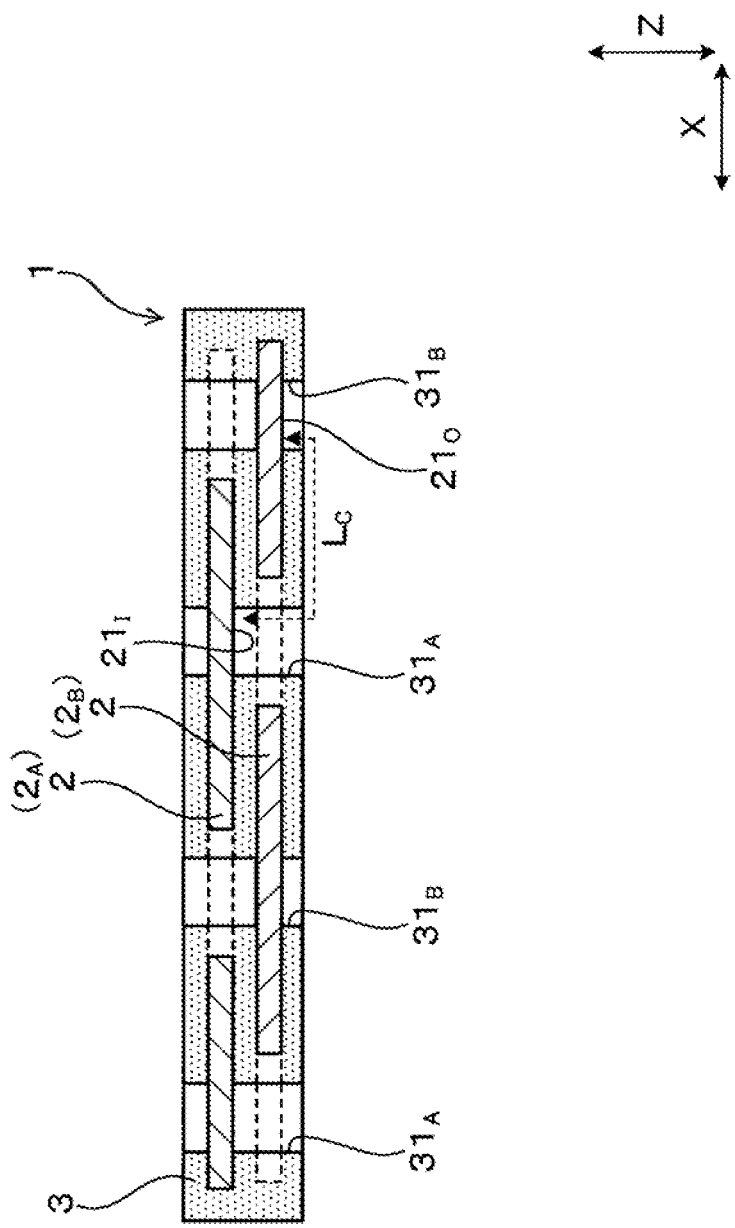

CONDUCTIVE MEMBER MODULE, AND PRODUCTION METHOD THEREFOR

CROSS-REFERENCE OF RELATED APPLICATION

The present application is a divisional Application of U.S. patent application Ser. No. 16/866,293 filed on May 4, 2020 which is a U.S. bypass application of International Application No. PCT/JP2018/040940 filed Nov. 5, 2018, which designated the U.S. and claims the benefit of priority from Japanese Patent Application No. 2017-214116, filed Nov. 6, 2017, The full disclosures of all of the above applications are incorporated herein by reference.

BACKGROUND

Technical Field

The present disclosure relates to a conductive member module having a pair of conductive members facing each other, and a sealing part for sealing the pair of conductive members, and also relates to a method for producing the same.

Description of the Related Art

A conductive member module having a pair of conductive members facing each other, and a sealing part for sealing the pair of conductive members is known a component used in electrical devices etc. In the production of such a conductive member module, a pair of conductive members are first accommodated in a molding die (accommodation step), and a resin is injected into the die to seal the pair of conductive members (sealing step). After the resin is solidified, the conductive member module is extracted from the die (extraction step).

SUMMARY

The present disclosure provides a conductive member module capable of reducing the parasitic inductance between a pair of conductive members, and also provides a method for producing the same.

A first aspect of the present disclosure is a method for producing a conductive member module having a pair of conductive members formed in a plate shape and facing each other, and a sealing part for sealing the pair of conductive members.

The method includes: an accommodation step of accommodating the pair of conductive members in a molding die in a state of being separated from each other, a sealing step of injecting a fluid resin into the die to seal the pair of conductive members, and an extraction step of extracting the conductive member module from the die.

BRIEF DESCRIPTION OF THE DRAWINGS

The above and other objects, features, and advantages of the present disclosure will become clearer from the following detailed description with reference to the accompanying drawings.

In the accompanying drawings:

FIG. 17 is an explanatory view of a method for producing a conductive member module in comparative example 1; and FIG. 18 is a cross-sectional view of the conductive member module in comparative example 1.

DETAILED DESCRIPTION OF THE PREFERRED EMBODIMENTS

As a conventional conductive member, for example, Japanese Patent Number 5446722 discloses a conductive member module in which the distance between the pair of conductive members is narrowed in order to reduce the parasitic inductance between the pair of conductive members. In the method for producing a conductive member module, in the sealing step, a pair of conductive members may receive a force from the resin in directions away from each other. Accordingly, the distance between the pair of conductive members may be widened, and there is a possibility that the parasitic inductance between the conductive members cannot be sufficiently reduced.

Hereinafter, with reference to the drawings, embodiments of the present disclosure will be described.

First Embodiment

Figure 1:
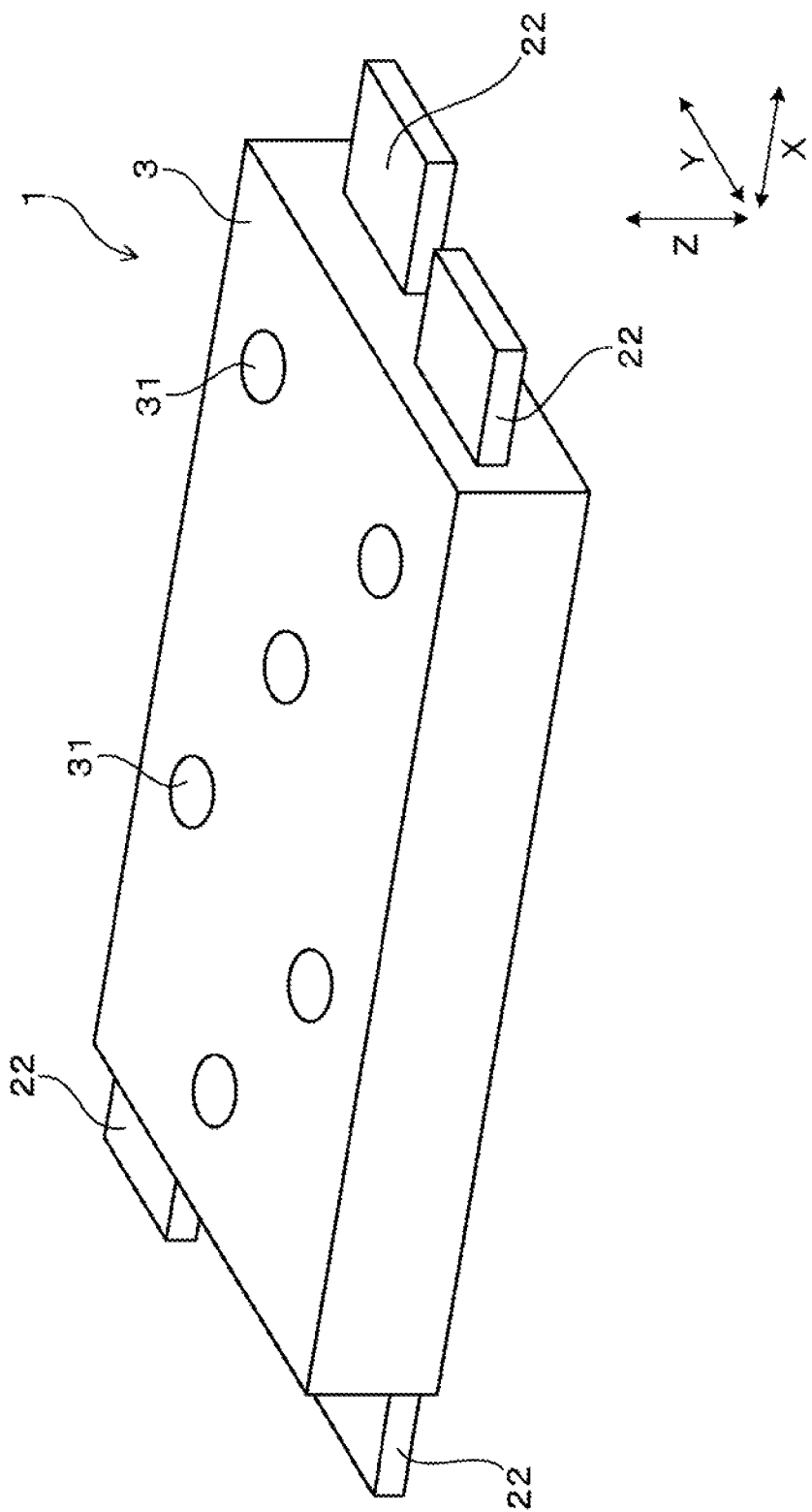
FIG. 1 is a perspective view of a conductive member module in first embodiment.
Figure 2:
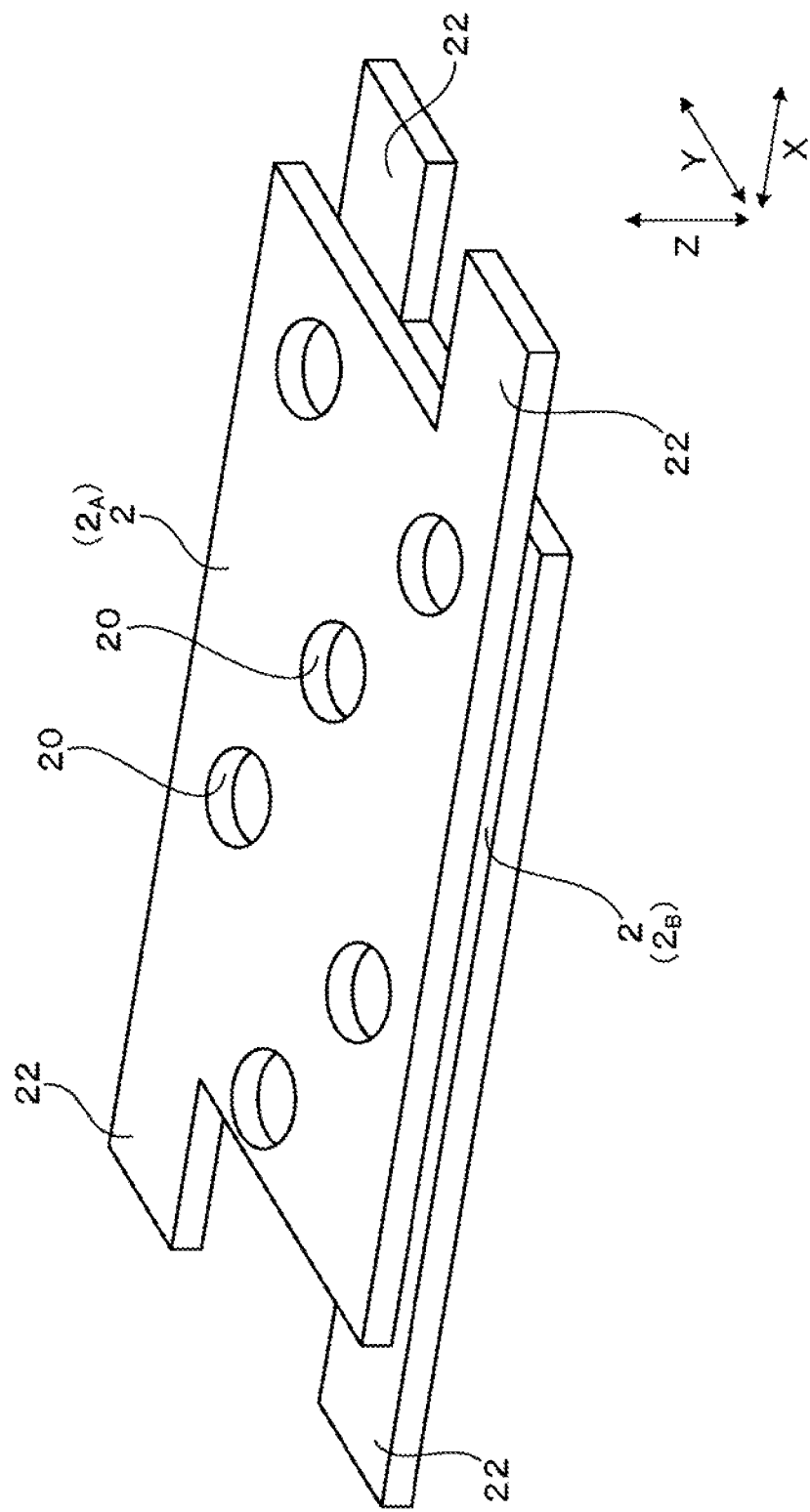
FIG. 2 is a perspective view of conductive members in first embodiment.

An embodiment relating to the method for producing a conductive member module is described with reference to FIGS. 1 to 11. As shown in FIGS. 1 and 2, the conductive member module 1 of the present embodiment has a pair of conductive members 2 formed in a plate shape and facing each other, and a sealing part 3 for sealing the pair of conductive members 2. In the present embodiment, the conductive member module 1 is produced by performing an accommodation step (see FIGS. 3 and 4), a sealing step (see FIGS. 5 and 6), and an extraction step (see FIGS. 7 and 8).

Figure 3:
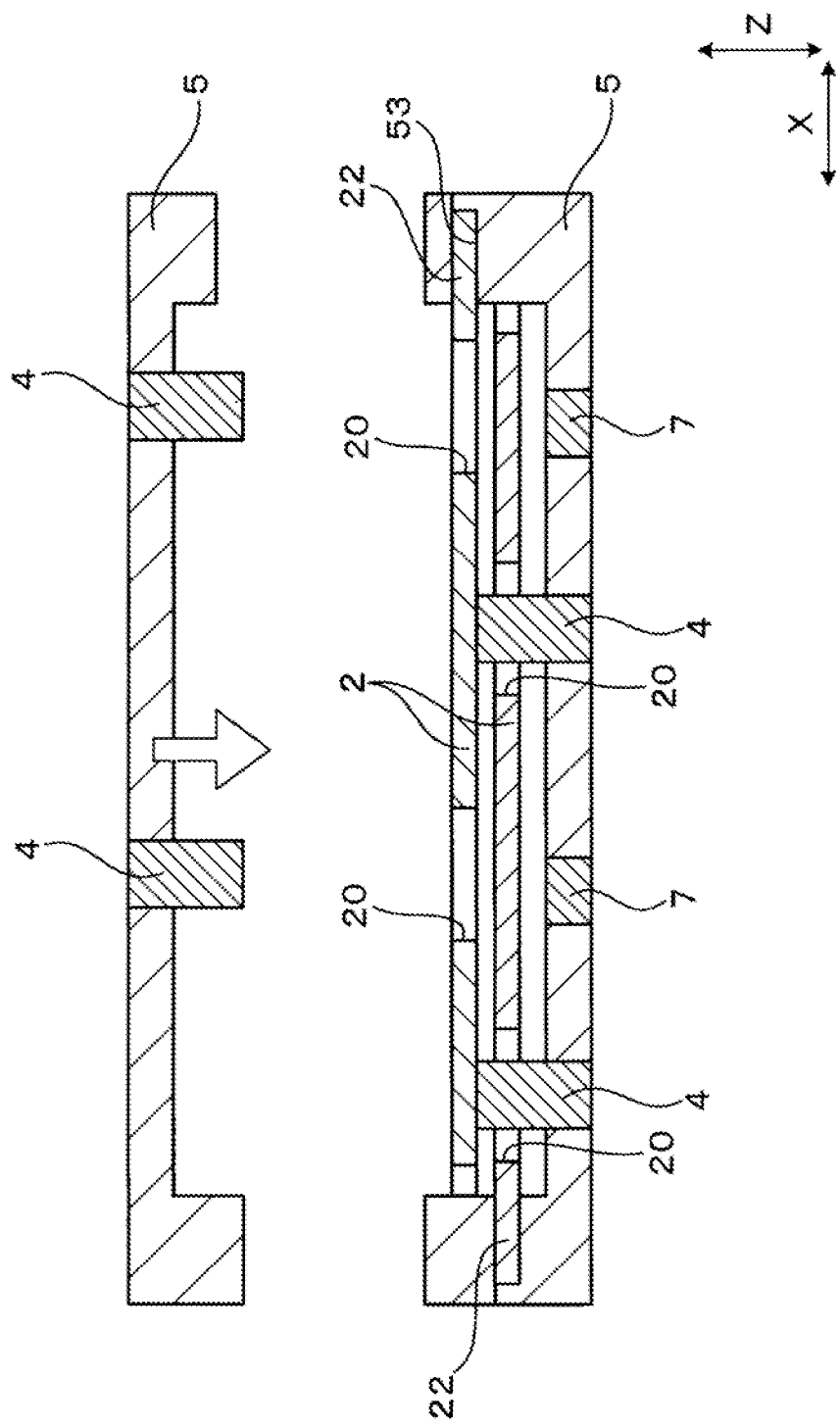
FIG. 3 is an explanatory view of a method for producing the conductive member module in first embodiment.
Figure 4:
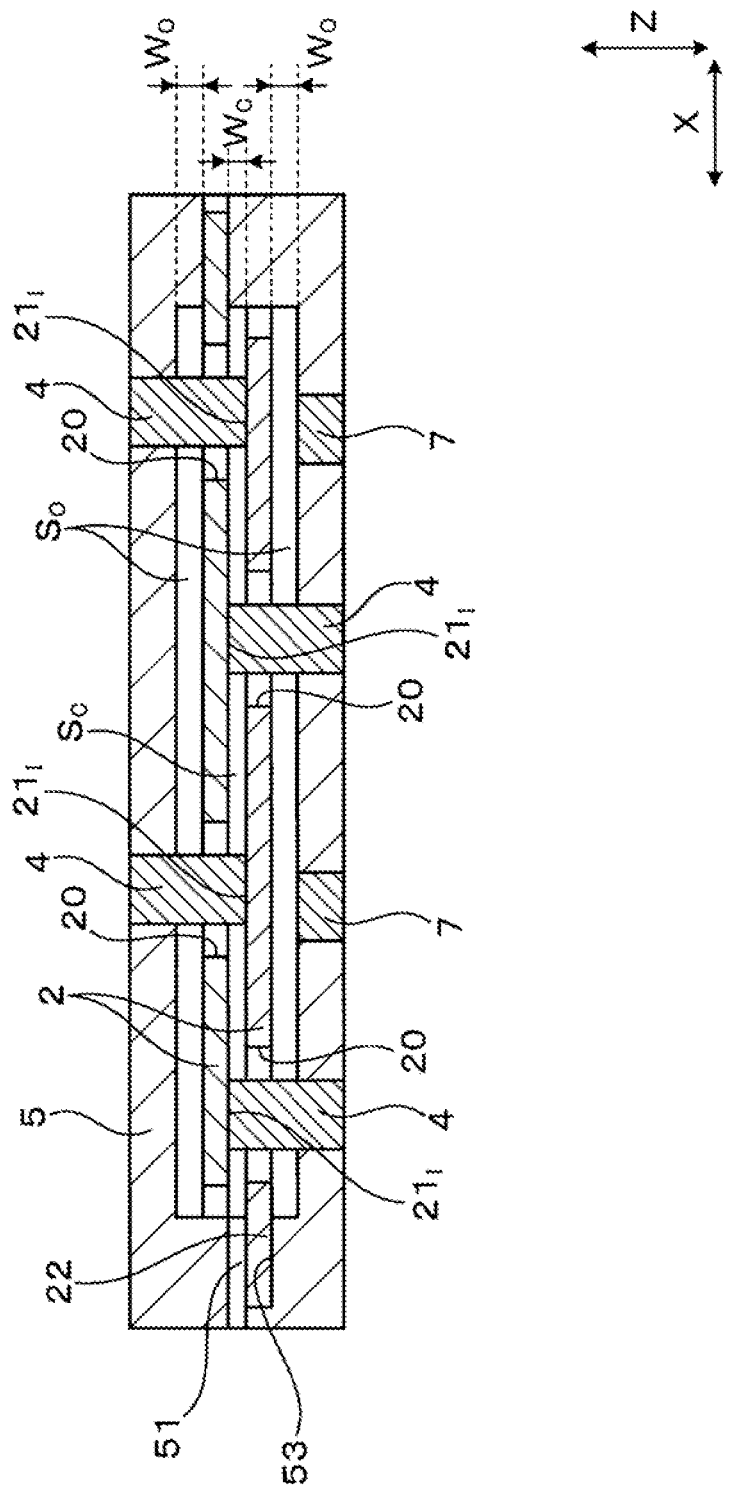
FIG. 4 is an explanatory view of the production method following FIG. 3.

As shown in FIGS. 3 and 4, in the accommodation step, the pair of conductive members 2 are accommodated in a molding die 5 in a state of being separated from each other.

Figure 5:
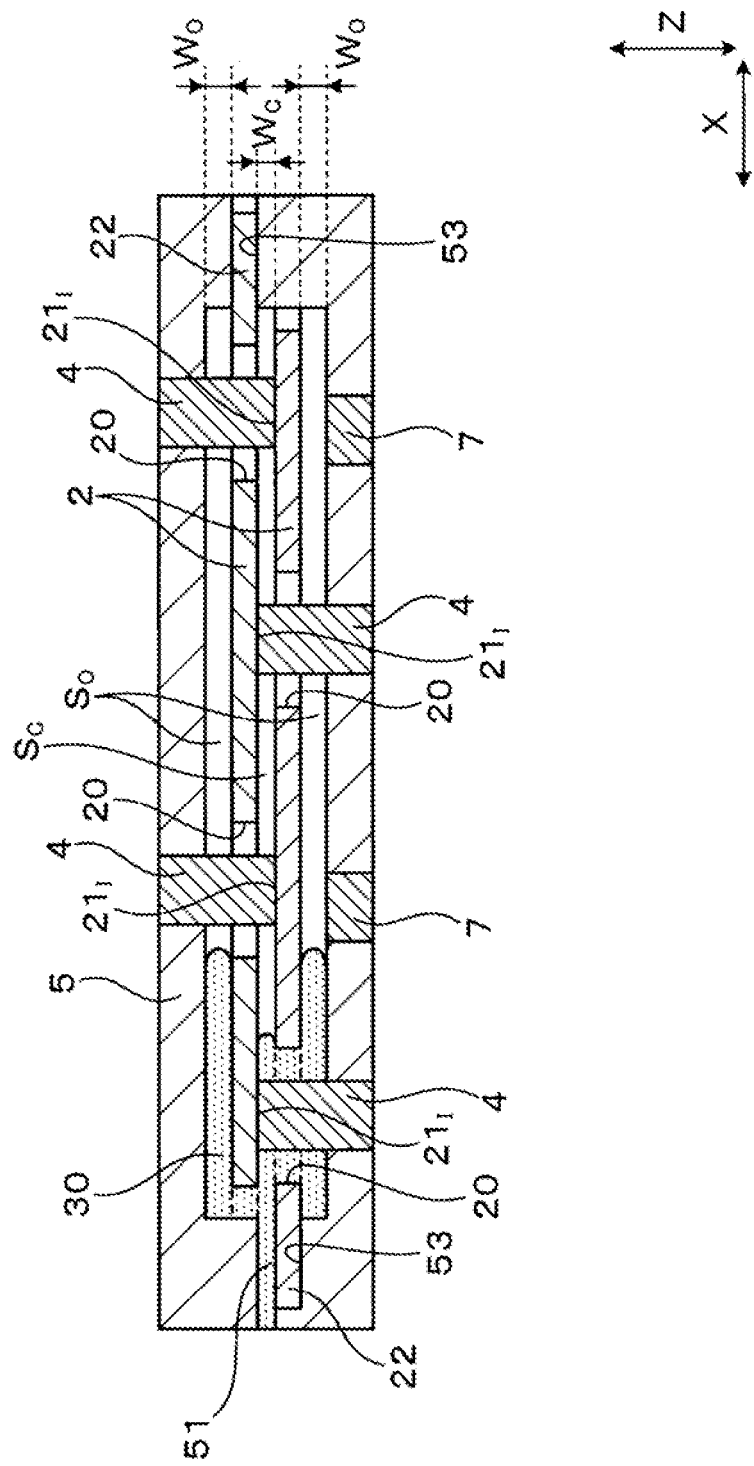
FIG. 5 is an explanatory view of the production method following FIG. 4.
Figure 6:
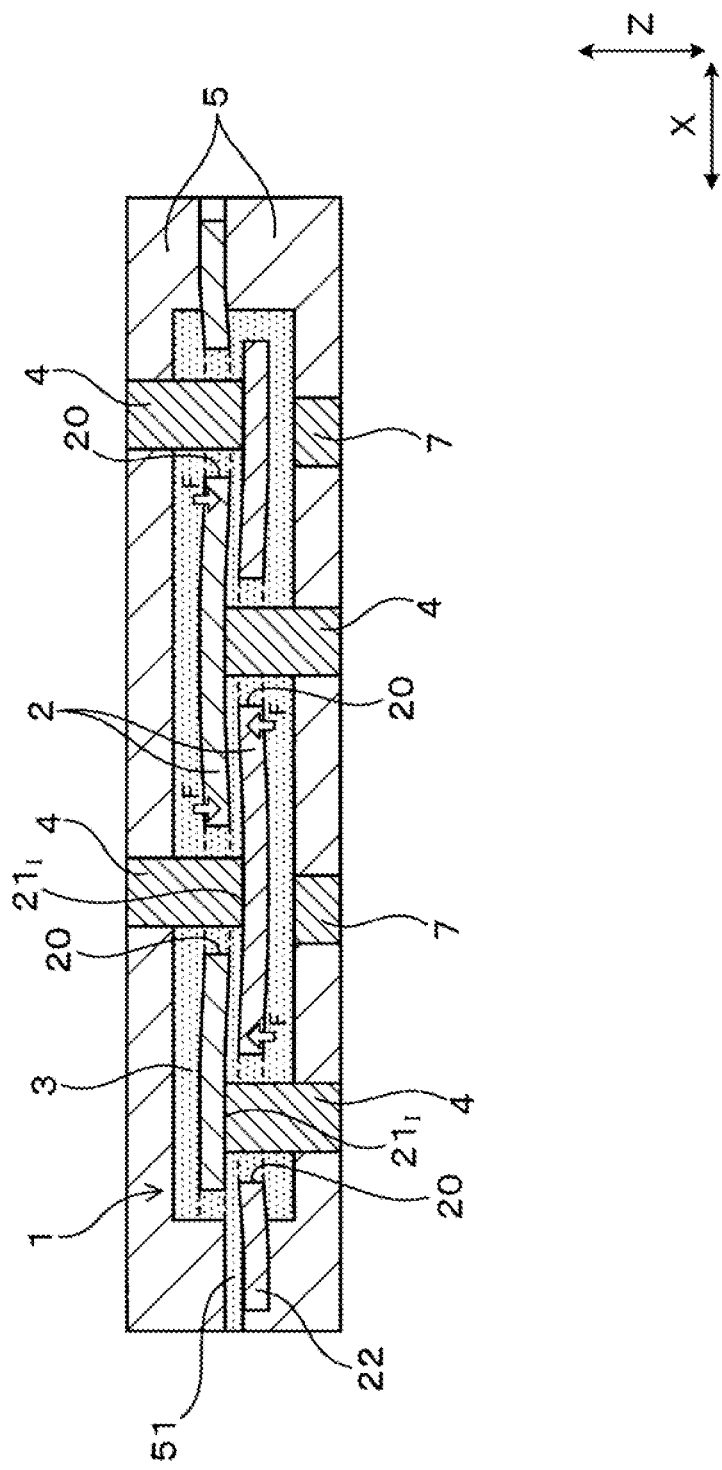
FIG. 6 is an explanatory view of the production method following FIG. 5.

Further, as shown in FIGS. 5 and 6, in the sealing step, a fluid resin 30 is injected into the die 5 to seal the pair of conductive members 2.

Figure 7:
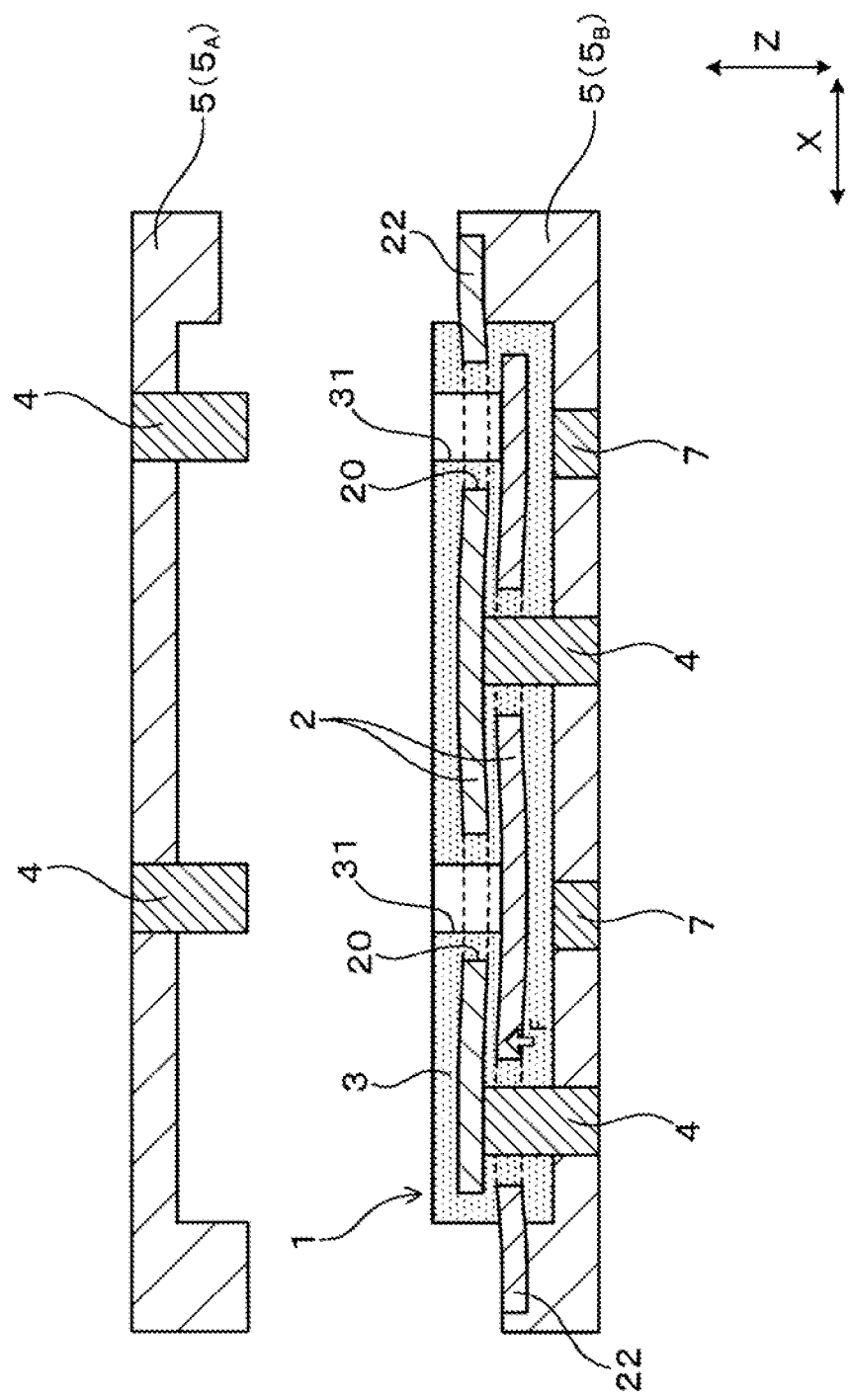
FIG. 7 is an explanatory view of the production method following FIG. 6.
Figure 8:
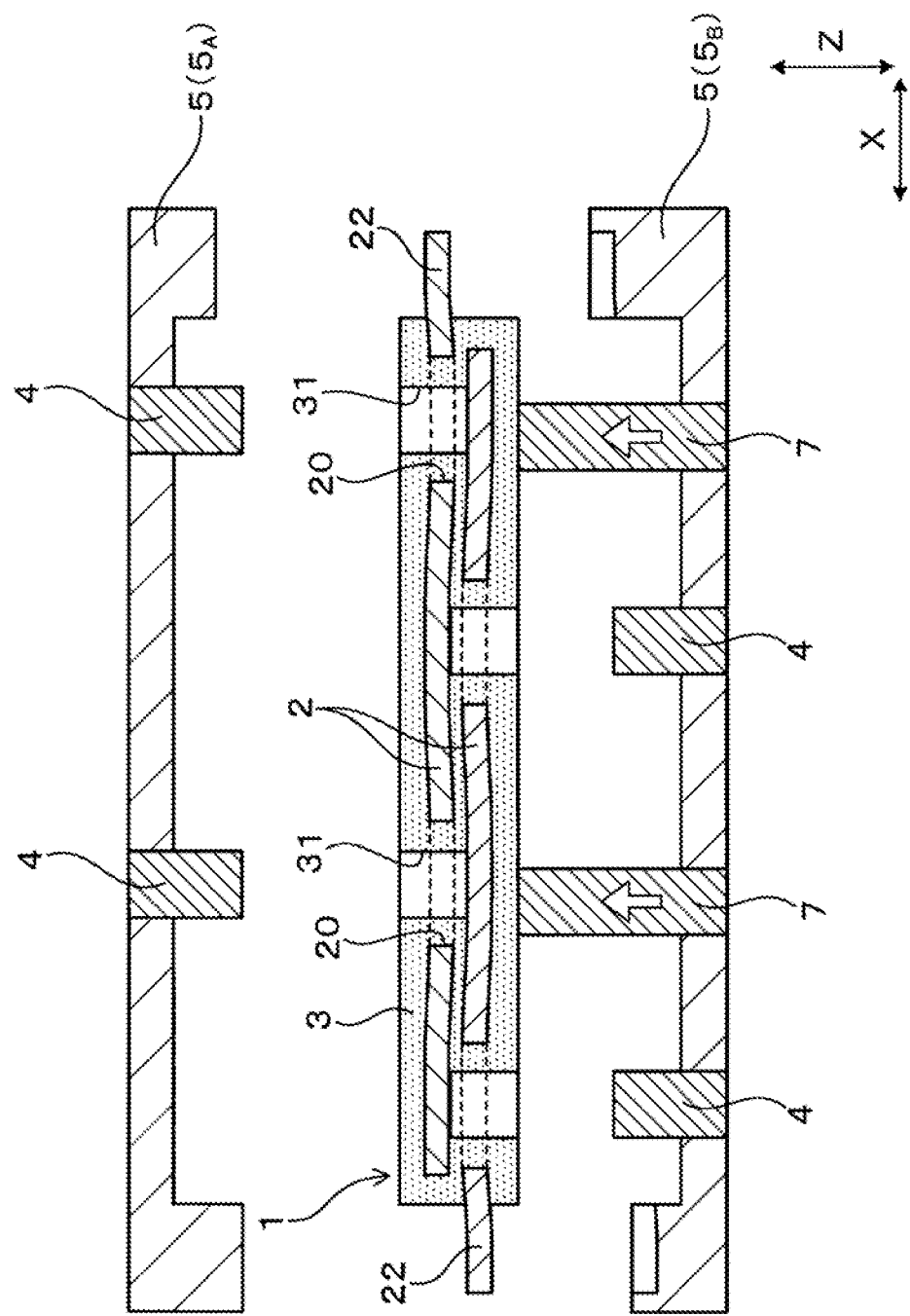
FIG. 8 is an explanatory view of the production method following FIG. 7.

As shown in FIGS. 7 and 8, in the extraction step, the conductive member module 1 is extracted from the die 5 after the resin 30 is solidified.

As shown in FIGS. 5 and 6, in the sealing step, the conductive members 2 are sealed while the individual conductive members 2, to which a force F is applied by the resin 30 injected into the die 5 in directions to approach each other in a facing orientation (Z direction) of the pair of conductive members 2, are supported by support members 4 from inside in the Z direction.

The term "inside" mentioned above means a side on which the other conductive member 2 is disposed in the Z direction. Further, in the following description, term "outside" means a side opposite to the side on which the other conductive member 2 is disposed.

Figure 11:
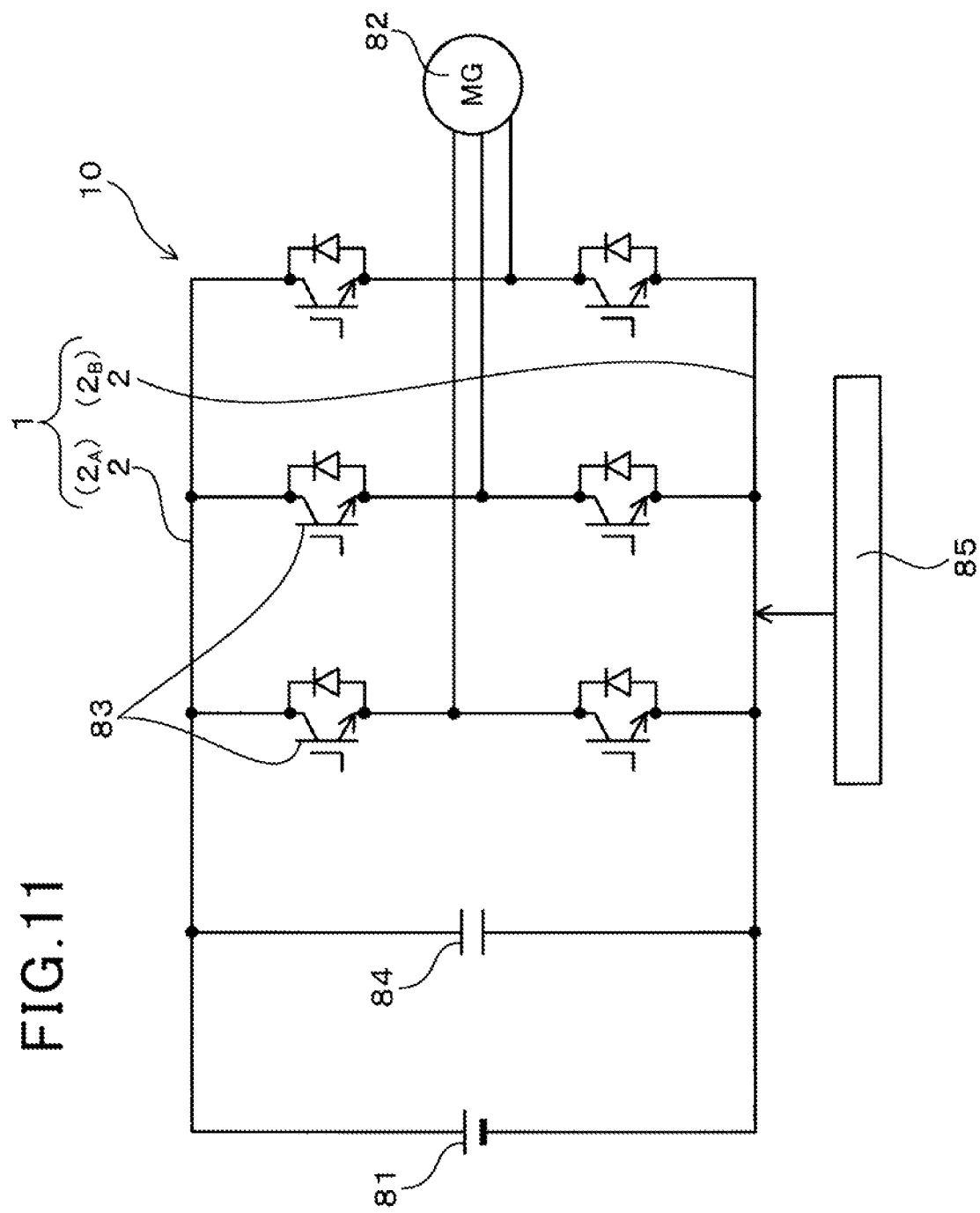
FIG. 11 is a circuit diagram of a power conversion device using the conductive member module in first embodiment.

As shown in FIG. 11, in the present embodiment, the conductive member module 1 is used in a power conversion device 10. The power conversion device 10 includes a smoothing capacitor 84 and a plurality of switching elements 83. The capacitor 84 and the switching elements 83 are electrically connected using the conductive members 2 in the conductive member module 1. The power conversion device 10 uses a control unit 85 to turn on and off the switching elements 83. A DC power supplied from a DC power supply 81 is thereby converted into an AC power to drive a three-phase AC motor 82.

As shown in FIGS. 1 and 2, each conductive member 2 includes a connection terminal 22. These connection terminals 22 are electrically connected to the capacitor 84, the switching elements 83, and the like. The pair of conductive members 2 are arranged in parallel to each other.

As shown in FIGS. 3 and 4, in the accommodation step, the pair of conductive members 2 are accommodated in the die 5. The connection terminals 22 of the conductive members 2 are sandwiched by the die 5 on split surfaces 53 of the die 5. As shown in FIG. 4, a central space $S_C$ is formed between the pair of conductive members 2. Further, outer spaces $S_O$ are formed between the individual conductive members 2 and the die 5 in the Z direction. The Z direction length $W_O$ of each outer space $S_O$ is longer than the 2 direction length $W_C$ of the central space $S_C$.

The conductive members 2 are each provided with a plurality of through holes 20 penetrating in the Z direction. The support members 4 are attached to the die 5. In the accommodation step, the support members 4 are inserted into the through holes 20. Then, the tips of the support members 4 are brought into contact with the inner surfaces $21_1$ of the conductive members 2 in the Z direction.

As shown in FIGS. 5 and 6, in the sealing step, the resin 30 is injected from a gate 51 of the die 5. The pair of conductive members 2 are thereby sealed with the resin 30. The gate 51 is formed in a position adjacent to the central space $S_C$ in a direction (X direction) orthogonal to the direction. In the sealing step, the resin 30 is injected from the gate 51 in the X direction. As the gate 51, a fan gate, a side gate, a film gate, or the like can be used. Moreover, in the present embodiment, the Z direction length $W_O$ of each outer space $S_O$ is longer than the Z direction length $W_C$ of the central space $S_C$, as described above. Therefore, the resin 30 flows into the outer spaces $S_O$ before the central space $S_C$, and the outer spaces $S_O$ are completely filled with the resin 30 earlier than the central space $S_C$. Accordingly, a force F is applied from the resin 30 to the individual conductive members 2 in directions to approach each other. Moreover, in a pressure-maintaining step after the flow of the resin 30 is completed, a force F is applied to the conductive members 2 in directions to approach each other, because the pressure loss of the resin 30 is larger in the central space $S_C$ than in the outer spaces $S_O$.

Further, in the present embodiment, the support members 4 are inserted into the through holes 20, and the tips of the support members 4 are brought into contact with the inner surfaces $21_1$ of the conductive members 2, as described above. In the present embodiment, the sealing step is performed while the individual conductive members 2 are supported by the support members 4 from inside in the Z direction in the sealing step. The individual conductive members 2 are thereby prevented from getting closer and coming into contact with each other.

When the sealing step is performed, a force F is received from the resin 30, and portions that are not supported by the support members 4 in the conductive members 2 are curved inward, as shown in FIG. 6. Therefore, the pair of conductive members 2 approach each other, and the parasitic inductance between these conductive members 2 can be reduced.

After the sealing step is performed, an extraction step is performed, as shown in FIGS. 7 and 8. In the extraction step, one die $5_A$ is first removed, as shown in FIG. 7. Next, as shown in FIG. 8, release pins 7 provided in the other die $5_B$ are pushed out, and the conductive member module 1 is extracted from the die $5_B$.

Figure 9:
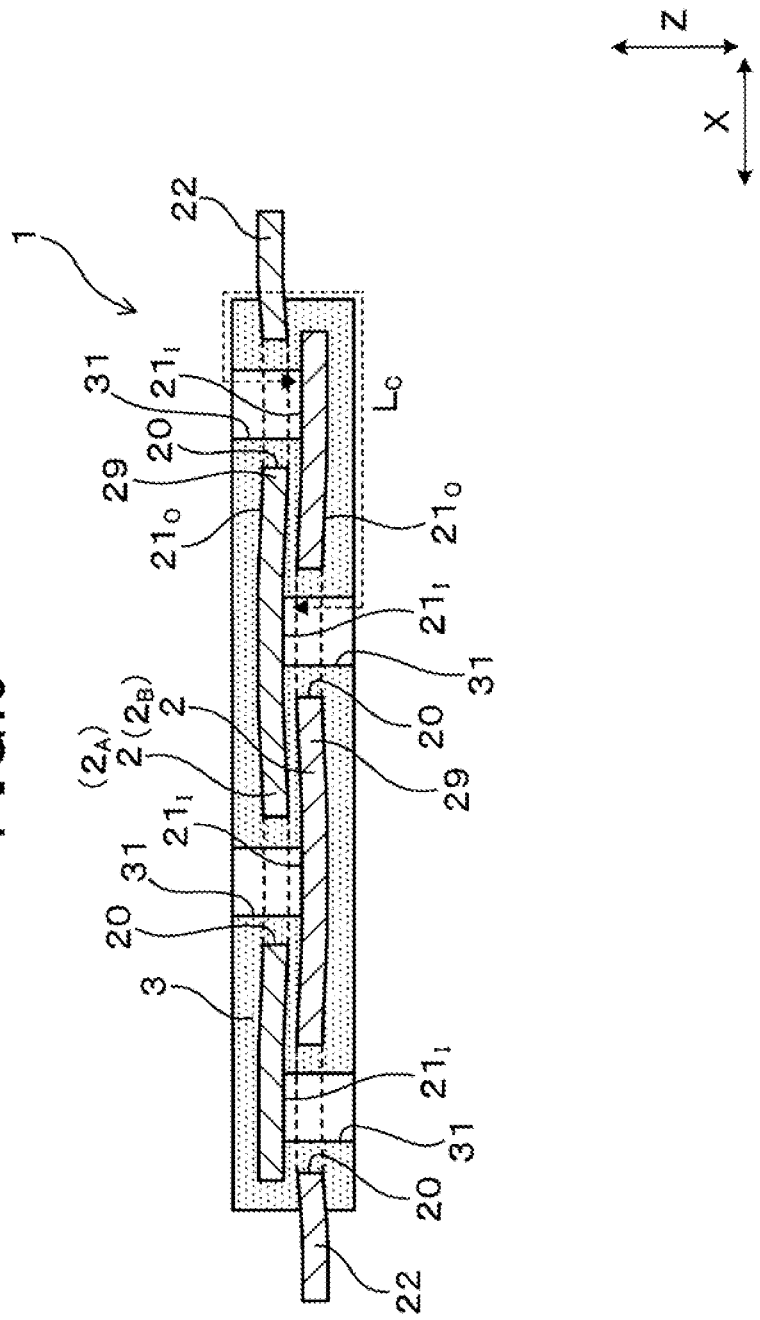
FIG. 9 is a cross-sectional view of the conductive member module in first embodiment.
Figure 10:
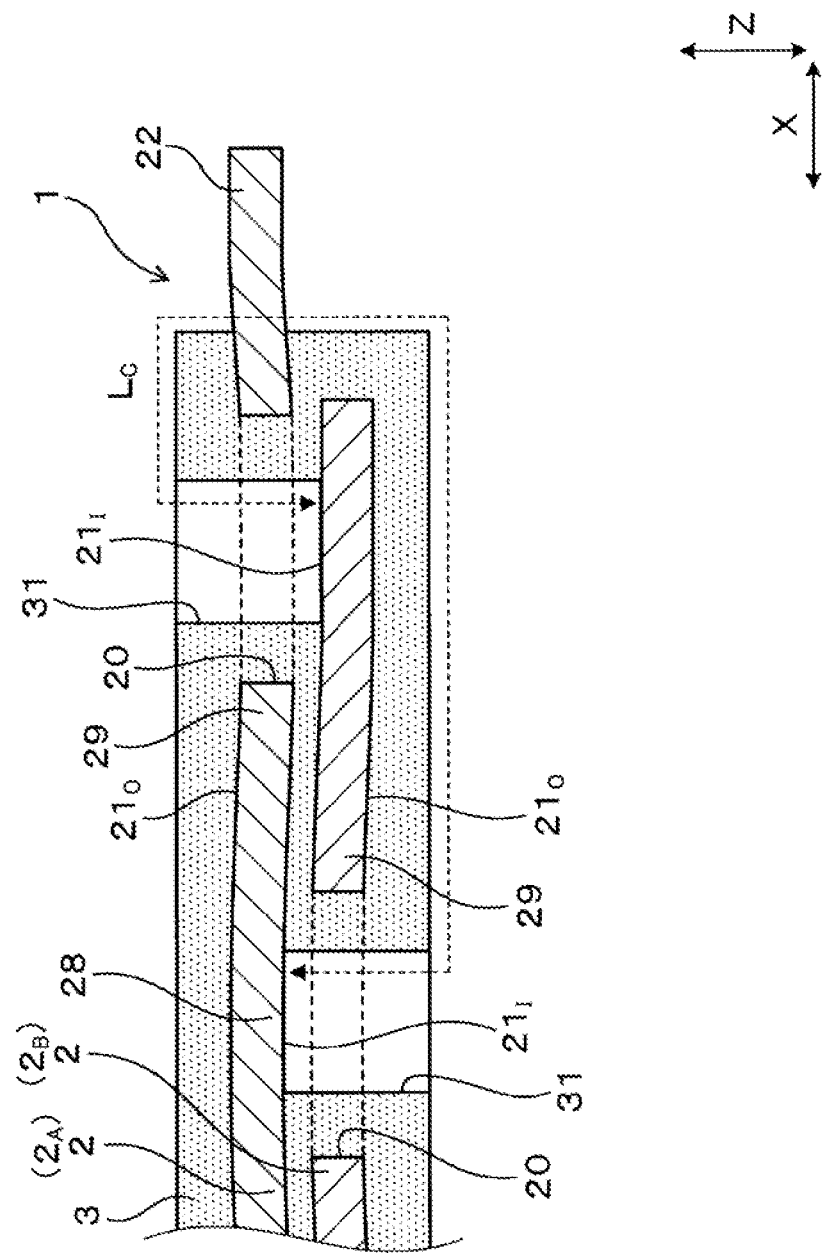
FIG. 10 is an enlarged view of part of FIG. 9.

FIGS. 9 and 10 show cross-sectional views of the produced conductive member module 1. As shown in these figures, recesses 31 are formed in the sealing part 3 in the positions in which the support members 4 are disposed. At the bottom of the recesses 31, the inner surfaces $21_1$ of the conductive members 2 are exposed. Moreover, portions or the conductive members 2 are curved inward due to the force F received from the resin 30 when the sealing step is performed. More specifically, portions that are not supported by the support members 4, i.e., the peripheries of the through holes 20, in the conductive members 2 are curved inward.

The working effects of the present embodiment will be described. As shown in FIG. 6, in the sealing step of the present embodiment, a force F is applied to the individual conductive members 2 by the injected resin 30 in directions to approach each other in the Z direction.

Accordingly, in the sealing step, the pair of conductive members 2 can be prevented from being separated from each other upon reception of a force from the resin 30. Therefore, the distance between the pair of conductive members 2 can be narrowed, and the parasitic inductance between the pair of conductive members 2 can be reduced.

That is, in a conventional method for producing a conductive member module 1, as shown in FIG. 17, in the sealing step, a force F was sometimes applied to the individual elf conductive members 2 from the resin 30 in directions away from each other in the Z direction. Accordingly, there was a possibility that portions that were not supported by the support members 4 in the conductive members 2 were curved outward, and that the distance between the pair of conductive members 2 was widened. Consequently, there was a possibility that the parasitic inductance between the pair of conductive members 2 was increased.

In contrast, when a force F is applied from the resin 30 to the conductive members 2 in directions to approach each other, as in the present embodiment, the distance between the conductive members 2 can be prevented from being widened. Therefore, the parasitic inductance between the pair of conductive members 2 can be reduced.

Further, when the above production method is employed, the resin 30 can be easily injected between the pair of conductive members 2 in the sealing step.

That is, in order to reduce the inductance, if the distance between the pair of conductive members 2 is narrowed too much in the stage before the injection of the resin 30 (see FIG. 4), the resin 30 may not be injected between the pair of conductive members 2 when the seating step is performed. In contrast, when the production method of the present embodiment is employed, the pair of conductive members 2 can be brought close to each other by the force F of the resin 30; thus, the distance between the pair of conductive members 2 can be widened to some extent in the stage before the injection of the resin 30. Therefore, the resin 30 can be reliably injected between the pair of conductive members 2.

Moreover, when the production method of the present embodiment is employed, the production cost of the conductive member module 1 can be reduced.

That is, the sealing step can also be performed after a resin is interposed between the pair of conductive members 2, followed by accommodation in the die 5; however, in this case, the number of steps may increase, and the amount of resin used may increase. In contrast, in the production method of the present embodiment, the pair of conductive members 2 are sealed in the sealing step without interposing a resin between the pair of conductive members 2; thus, the number of steps and the amount of resin used can be reduced, and the production cost of the conductive member module 1 can be reduced.

As shown in FIGS. 5 and 6, in the sealing step of the present embodiment, the outer spaces $S_O$ are completely filled with the resin 30 earlier than the central space $S_C$.

Therefore, in the sealing step, the force F can be reliably applied from the resin 30 to the individual conductive member 2 in directions to approach each other.

As shown in FIGS. 5 and 6, in the present embodiment, the outer spaces $S_O$ are longer in the Z direction than the central space $S_C$.

Accordingly, the filling of the outer spaces $S_O$ with the resin 30 can reliably precede the central space $S_C$. Therefore, in the sealing step, the force F can be easily applied from the resin 30 to the individual conductive members 2 in directions to approach each other (directions from the outer spaces $S_O$ toward the central space $S_C$). Consequently, the distance between the pair of conductive members 2 can be narrowed, and the parasitic inductance between them can be reduced.

As shown in FIG. 5, in the sealing step of the present embodiment, the resin 30 is injected into the die 5 in a direction (X direction) orthogonal to the Z direction.

Figure 16:
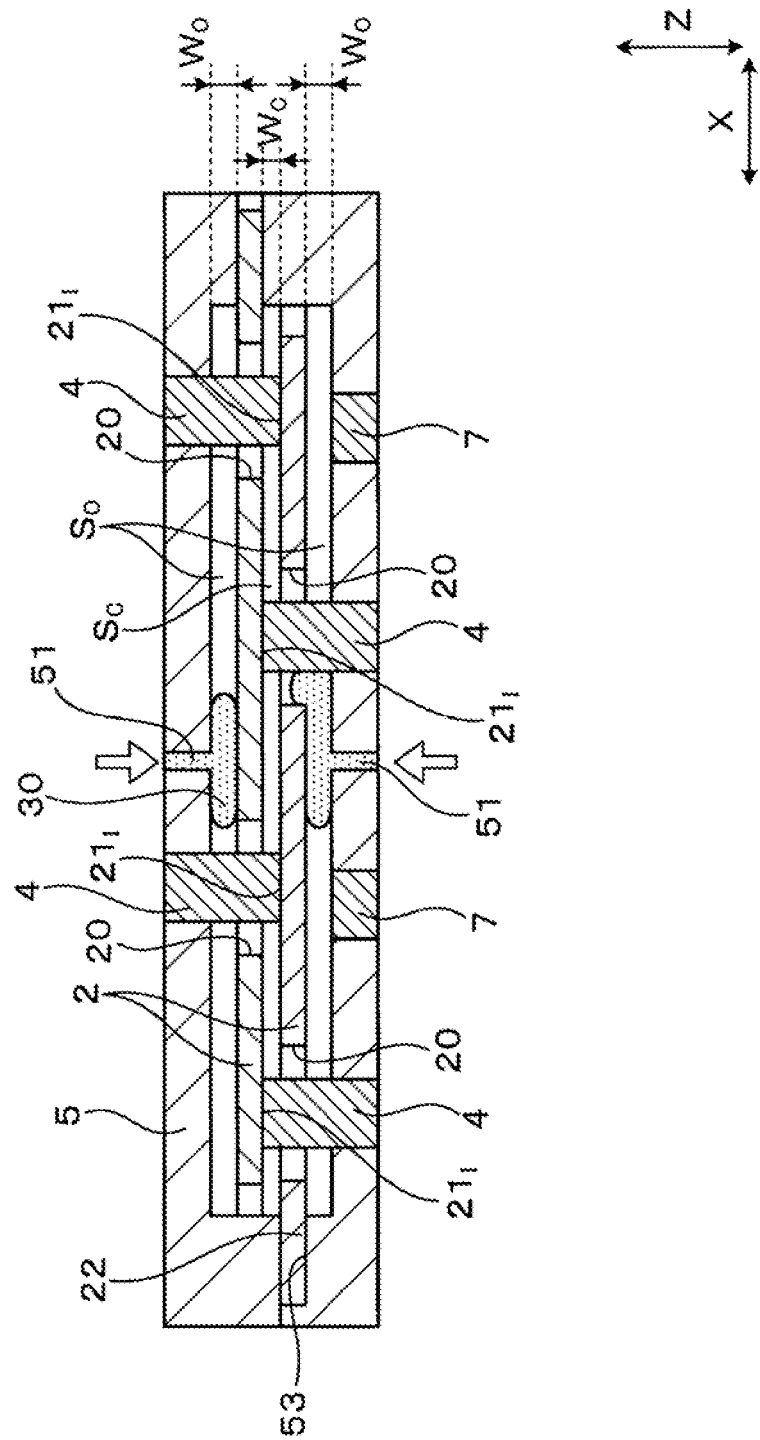
FIG. 16 is an explanatory view of a method fir producing, a conductive member module in fourth embodiment.

Therefore, the resin 30 can be reliably injected into the central space $S_C$. That is, the resin 30 can also be injected in the Z direction, as shown in FIG. 16; however, in this case, the resin 30 is less likely to enter the central space $S_C$ from the outer spaces $S_O$, and the central space $S_C$ may not be sufficiently filled with the resin 30. In contrast, when the resin 30 is injected in the X direction, as in the present embodiment, the resin 30 can sufficiently flow into both the outer spaces $S_O$ and the central space $S_C$.

As shown in FIGS. 5 and 6, the conductive members 2 are each provided with through holes 20 penetrating in the Z direction. In the sealing step, the pair of conductive members 2 are sealed while the individual conductive members 2 are supported by the support members 4 inserted into the through holes 20 from inside in the Z direction.

This can suppress the problem that the pair of conductive members 2 get closer and come into contact with each other due to the force F of the resin 30. Therefore, while sufficiently enhancing the insulation properties of the pair of conductive members 2, the parasitic inductance between the pair of conductive members 2 can be reduced. Further, when through holes 20 are formed, and support members 4 are inserted into the through holes 20, the conductive members 2 can be supported from inside in any position.

As described above, in the sealing step of the present embodiment, the force F is applied from the resin 30 to the individual conductive members 2 in directions to approach each other. Accordingly, it is only necessary to support the conductive members 2 from inside by the support members 4, and it is not necessary to support them from outside. Therefore, the number of recesses 31 formed in the sealing part 3 can be reduced, the strength of the sealing part 3 can be increased, and the insulation properties of the pair of conductive members 2 can be enhanced.

That is, in a conventional method for producing a conductive member module 1, as shown in FIG. 17, the conductive members 2 sometimes approached or separated from each other upon reception of a force F from the resin 30 in the sealing step. It was thus necessary to support the conductive members 2 from both sides in the Z direction. Therefore, as shown in FIG. 18, many recesses 31 were formed in the sealing part 3 of the produced conductive member module 1. That is, in the sealing step (see FIG. 17), the inside of the conductive members 2 was supported by support members 4, and the outside thereof was supported by externally arranged members 6. Thus, the sealing part 3 had two types of recesses 31, i.e., a first recess $31_A$ formed by the support member 4, and a second recess $31_B$ formed by the externally arranged member 6. For this reason, the number of recesses 31 was increased, and the strength of the sealing part 3 tended to be reduced. Further, since the inner surface $21_I$ of one conductive member $2_A$ was exposed at the bottom of the first recess $31_A$, and the outer surface $21_O$ of the other conductive member $2_B$ was exposed at the bottom of the second recess $31_B$ adjacent to the first recess, the creepage distance $L_C$ between the pair of conductive members $2_A$ and $2_B$ tended to be short. Therefore, the insulation properties between the pair of conductive a members $2_A$ and $2_B$ tended to be lowered.

In contrast, as shown in FIG. 6, when a force F is applied to the individual conductive members 2 from the resin 30 in directions to approach each other in the sealing step, as in the present embodiment, it is not necessary to provide supporting members (see the externally arranged members 6 in FIG. 17) outside the conductive members 2. Therefore, as shown in FIGS. 9 and 10, only the inner surface $21_I$ of each conductive member 2 can be exposed, without exposing the outer surface $21_O$ thereof. Accordingly, the creepage distance $L_C$ between the pair of conductive members $2_A$ and $2_B$ can be increased, and the insulation properties between these conductive members $2_A$ and $2_B$ can be enhanced.

Further, as shown in FIG. 6, in the sealing step of the present embodiment, the conductive members 2 are sealed with the resin 30 injected into the die 5 while portions that are not supported by the support members 4 in the conductive members 2 are curved inward in the Z direction.

This makes it possible to narrow the distance between the pair of conductive members 2 in the curved portions. Therefore, the parasitic inductance between the conductive members 2 can be reliably reduced.

In the present embodiment, the support members 4 are formed separately from the die 5.

Therefore, the support members 4 can be easily replaced when they are worn.

As shown in FIGS. 5 and 6, in the sealing step of the present embodiment, the conductive members 2 are sealed while the connection terminals 22 of the conductive members 2 are sandwiched by the die 5 on split surfaces 53 of the die 5.

This makes it possible to suppress the sealing of the connection terminals 22 with the resin 30.

As shown in FIGS. 9 and 10, the conductive member module 1 of the present embodiment is configured so that surrounding parts 29 of the through holes 20, which are portions of the conductive members 2, are curved inward in the Z direction.

For this reason, the curved portions approach the other conductive member 2, and the parasitic inductance between them can be reduced.

In the conductive member module 1 of the present embodiment, the outer surfaces $21_O$ of the conductive members 2 are entirely covered with the resin 30, which constitutes the sealing part 3. That is, the conductive members 2 are configured to expose only their inner surfaces $21_I$.

Therefore, the creepage distance $L_C$ between the pair of conductive members 2 can be increased, and the insulation properties between the conductive members 2 can be enhanced.

As shown in FIG. 10, in the present embodiment, recesses 31 are formed in the sealing part 3. The recesses 31 are formed so s to be recessed in the Z direction through the through holes 20 from the outside to the inside of the pair of conductive members 2. At the bottom of the recesses 31, the inner surfaces $21_I$ of the conductive members 2 are exposed. Further, portions (surrounding parts 29) around the through holes 20 in the conductive members 2 are curved inward in the Z direction.

This makes it possible to curve the surrounding parts 29 inward; thus, the surrounding parts 29 can be brought close to the adjacent conductive member 2. Therefore, the parasitic inductance between them can be reduced. Moreover, in one conductive member $2_A$, portions 28 adjacent to the through holes 20 of the other conductive member $2_B$ in the Z direction are supported by: the support members 4 in the sealing step, and are thus not greatly curved. Accordingly, even if the surrounding parts 29 are curved inward, they are less likely to come into contact with the portions 28. Therefore, while suppressing the contact between the pair of conductive members 2, the distance between the pair of conductive members 2 can be narrowed.

As described above, the present embodiment makes it possible to provide a conductive member module that can further reduce the parasitic inductance between a pair of conductive members, and to also provide a method for producing the same.

In the following embodiments, among the reference numerals used in the drawings, those that are the same as the reference numerals used in first embodiment represent the same constituents as those of first embodiment, unless otherwise indicated.

Second Embodiment

Figure 12:
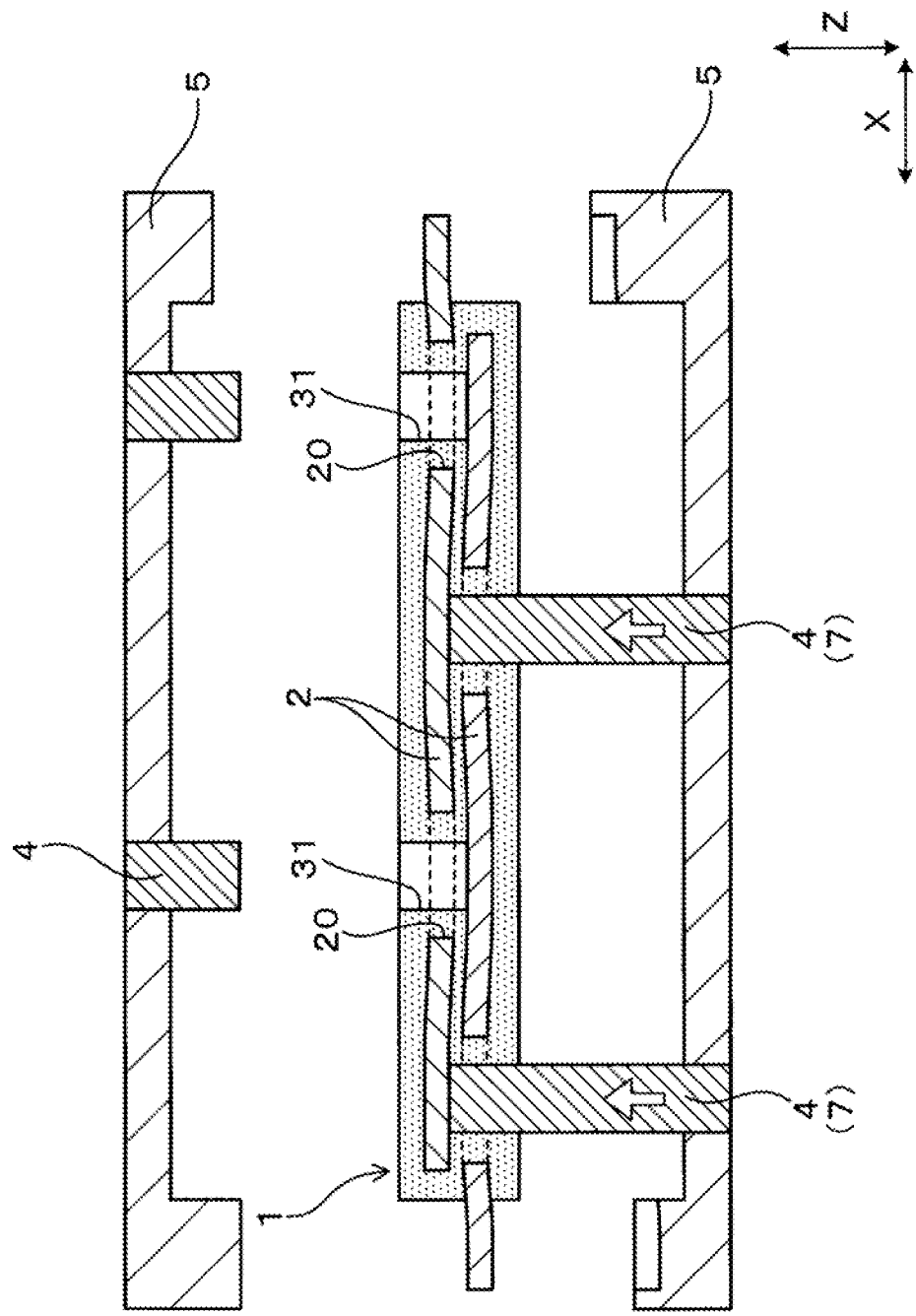
FIG. 12 is an explanatory view of a method for producing a conductive member module in second embodiment.

The present embodiment is an example in which the extraction step is changed. As shown in FIG. 12, in the extraction step of the present embodiment, support members 4 are pushed out to release a conductive member module 1. That is, in the present embodiment, the support members 4 also serve as release pins 7.

With the above configuration, it is not necessary to provide dedicated release pins 7, and the number of parts required to produce the conductive member module 1 can be reduced.

In addition, the present embodiment has the same configurations and working effects as those of first embodiment.

Third Embodiment

Figure 13:
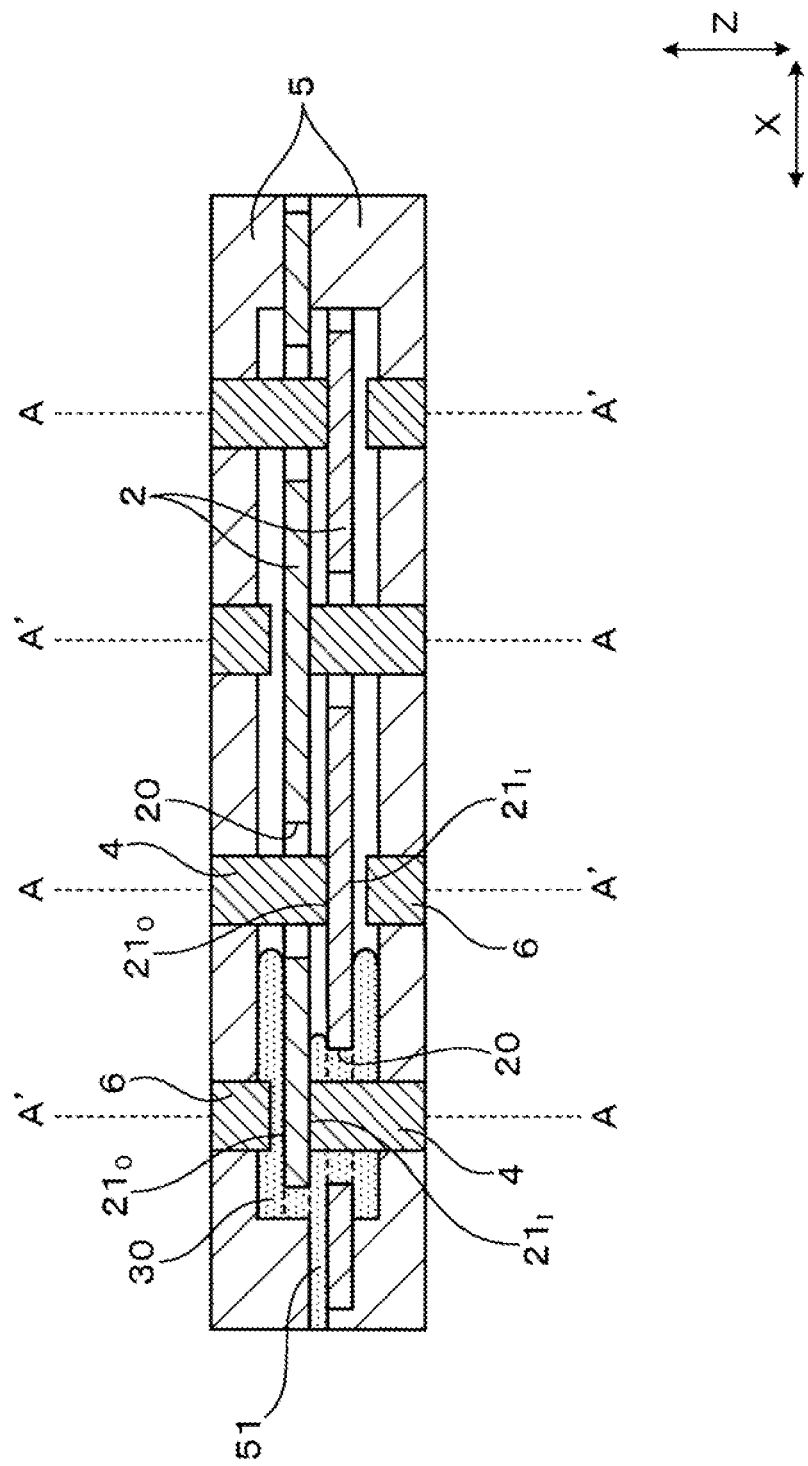
FIG. 13 is an explanatory view of a method for producing a conductive member module in third embodiment.
Figure 14:
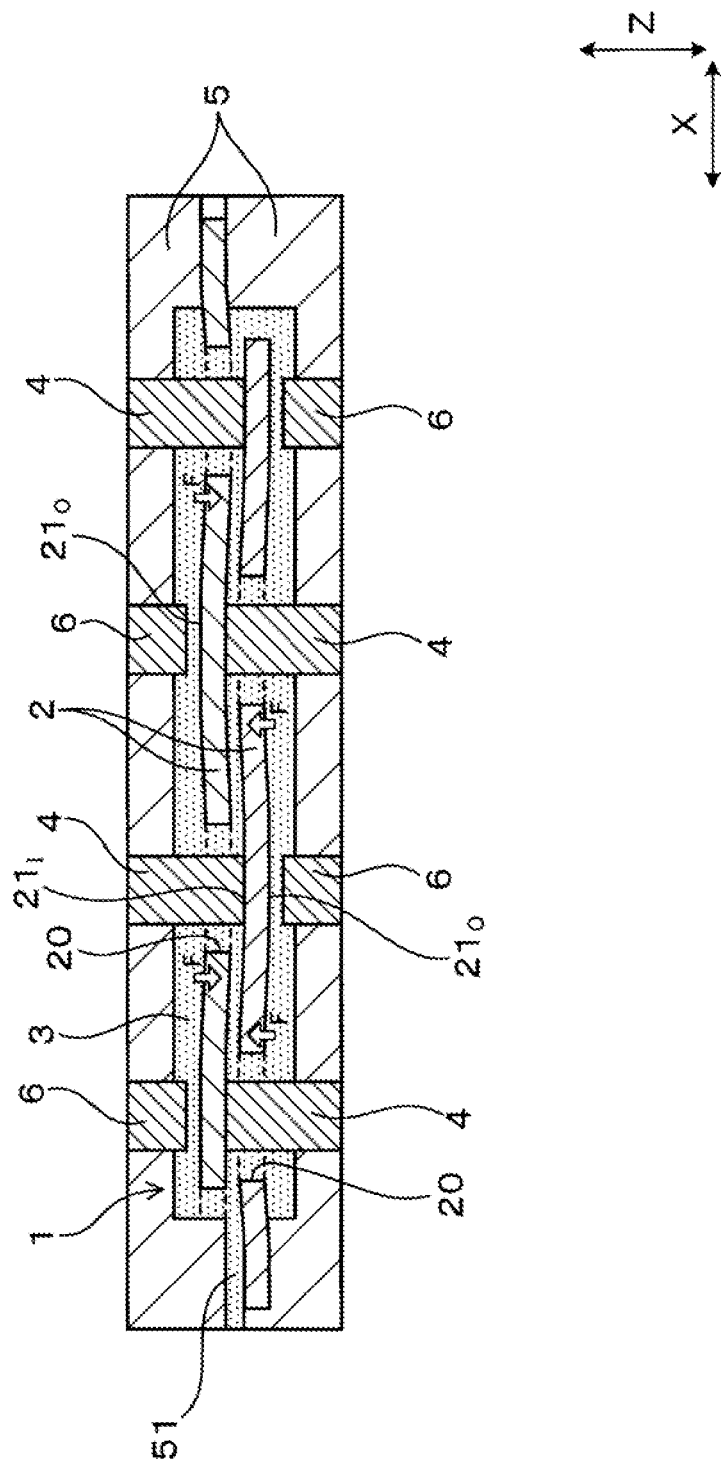
FIG. 14 is an explanatory view of the production method following FIG. 13.

The present embodiment is an example in which the sealing step is changed. As shown in FIGS. 13 and 14, in the present embodiment, the sealing, step is performed in a state in which externally arranged members 6 are disposed outside a pair of conductive members 2. The tips of the externally arranged members 6 are not in contact with the outer surfaces $21_O$ of the conductive members 2. Moreover, similarly to first embodiment, in the present embodiment, support members 4 are inserted into through holes 20, and the conductive members 2 are sealed while the conductive members 2 are supported by the support members 4 from inside. Each support member 4 and each externally arranged member 6 are arranged in positions in which their axes A and A' coincide with each other.

In the sealing step, similarly to first embodiment, the conductive members 2 are sealed while a force F is applied from the resin 30 to the individual conductive members 2 in directions to approach each other. Portions of the conductive members 2 are thereby curved inward, and the distance between the pair of conductive members 2 is narrowed. In this manner, the parasitic inductance between the pair of conductive members 2 is reduced.

The working effects of the present embodiment will be described. In the present embodiment, the externally arranged members 6 are arranged outside the conductive members 2. Therefore, even if a force F is applied to the conductive members 2 in directions away from each other, the conductive members 2 abut the externally arranged members 6; thus, the distance between the conductive members 2 can be prevented from being widened too much. Therefore, the inductance between the pair of conductive members 2 can be prevented from increasing too much.

Figure 15:
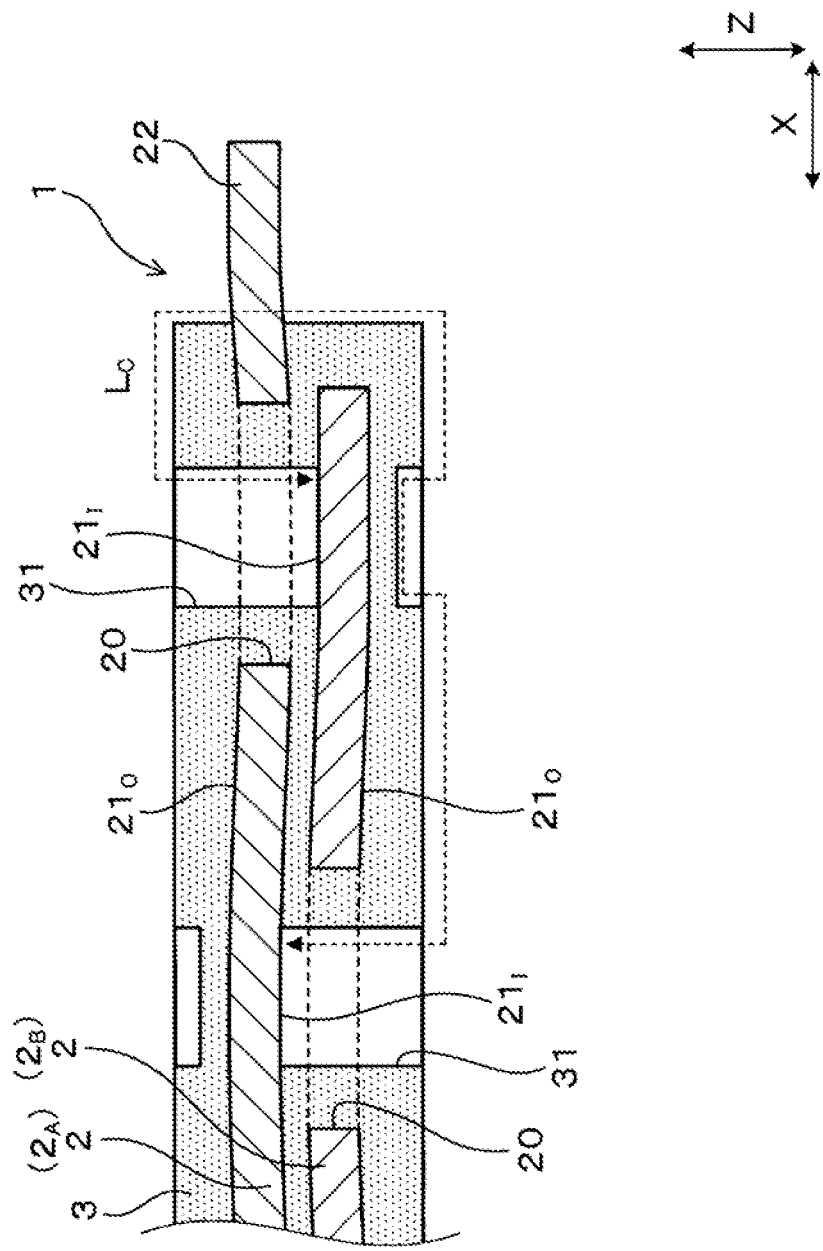
FIG. 15 is an enlarged cross-sectional view of part of the conductive member module in third embodiment.

Moreover, in the present embodiment, the sealing step is performed in a state in which the externally arranged members 6 are separated from the outer surfaces $21_O$ of the conductive members 2. Accordingly, the resin 30 is injected between the externally arranged members 6 and the conductive members 2, and the outer surfaces $21_O$ of the conductive members 2 are entirely covered with the resin 30, as shown in FIG. 15. Therefore, only the inner surfaces $21_I$ of the conductive members 2 can be exposed, and the creepage distance $L_C$ between the pair of conductive members 2 can be increased. Consequently, the insulation properties between the pair of conductive members 2 can be enhanced.

In addition, the present embodiment has the same configurations and working effects as those of first embodiment.

In the present embodiment, as shown in FIG. 13, each support member 4 and each externally arranged member 6 are arranged so that their axes A and A' coincide with each other; however, the present disclosure is not limited thereto, and these axes may not coincide with each other.

Moreover, in the present embodiment, as shown is FIGS. 13 and 14, the sealing step is performed in a state in which the externally arranged members 6 are separated from the outer surfaces $21_O$ of the conductive members 2; however, the present disclosure is not limited thereto, and the externally arranged members 6 may be brought into contact with the outer surfaces $21_O$.

Fourth Embodiment

The present embodiment is an example in which the position of the gate 51 and the direction of injecting the resin 30 are changed. As shown in FIG. 16, in the present embodiment, gates 51 are formed in positions adjacent to the outer spaces $S_O$ in the Z direction. In the sealing step, the resin 30 is injected in the Z direction. The pair of conductive members 2 are thereby sealed with the resin 30. The resin 30 enters the central space $S_C$ from the through holes 20 etc. and fills the central space $S_C$.

In the present embodiment, a force F of injecting the resin 30 is directly applied to the conductive members 2. Therefore, a strong force F can be applied from the resin 30 to the pair of conductive members 2 in directions to approach each other.

Moreover, in the present embodiment, similarly to First embodiment, the Z direction length $W_O$ of the outer spaces $S_O$ is longer than the Z direction length $W_C$ of the central space $S_C$. Accordingly, the resin 30 can easily flow into the outer spaces $S_O$, and the outer spaces $S_O$ are completely filled with the resin 30 earlier than the central space $S_C$. Therefore, a force generated when the resin 30 is injected from the gates 51 and a force generated when the resin 30 flows into the outer spaces $S_O$ can be both applied to the pair of conductive members 2. Consequently, the pair of conductive members 2 can be effectively prevented from being separated from each other, and the parasitic inductance between the pair of conductive members 2 can be effectively reduced.

The present disclosure is described according to embodiments; however, it is understood that the present disclosure is not limited to the embodiments and configurations. The present disclosure also includes various modified examples and modifications within an equivalent range. In addition, various combinations and configurations, and other combinations and configurations including more, less, or only a single element, are also within the spirit and scope of the present disclosure.

Conclusion

The present disclosure is to provide a conductive member module that can further reduce the parasitic inductance between a pair of conductive members, and to also provide a method for producing the same.

A first aspect of the present disclosure is a method for producing a conductive member module having a pair of conductive members formed in a plate shape and facing each other, and a sealing part for sealing the pair of conductive members, the method comprising performing:
an accommodation step of accommodating the pair of conductive members in a molding die in a state of being separated from each other,
a sealing step of injecting a fluid resin into the die to seal the pair of conductive members, and
an extraction step, of extracting the conductive member module from the die;
wherein in the sealing step, the conductive members are sealed while the individual conductive members, to which a force is applied by the resin injected into the die in directions to approach each other in a facing orientation of the pair of conductive members, are supported by support members from inside in the facing orientation.

Further, a second aspect of the present disclosure is a conductive member module comprising:
a pair of conductive members formed in a plate shape and facing each other, and
a sealing part made of a resin and sealing the pair of conductive members;
wherein at least portions of the conductive members are curved inward in a facing orientation of the pair of conductive members.

In the method for producing a conductive member module, in the sealing step, a force is applied to the individual conductive members by the injected resin in directions to approach each other in the facing orientation.

Accordingly, it is possible to suppress the pair of conductive members from being separated from each other in the sealing step. Therefore, the distance between the pair of conductive members can be narrowed, and the parasitic inductance between the pair of conductive members can be reduced.

Further, in the conductive member module, at least portions of conductive members are curved inward in the facing orientation.

Therefore, the distance between the pair of conductive members can be narrowed, and the parasitic inductance between the pair of conductive members can be reduced.

As described above, these aspects make it possible to provide a conductive member module that can further reduce the parasitic inductance between a pair of conductive members, and to also provide a method for producing the same.

What is claimed is:
1. A conductive member module comprising:
a pair of conductive members formed in a plate shape and facing each other, and
a sealing part made of a resin and sealing the pair of conductive members;
wherein at least portions of the conductive members are curved inward in a facing orientation to form a curved portion in each of the pair of conductive members, and
a distance between the pair of conductive members at the curved portion of each of the pair of conductive members is less than a distance between the pair of conductive members at other portions of the pair of conductive members.
2. The conductive member module according to claim 1, wherein the individual conductive members are provided with through holes penetrating in the facing orientation,
the sealing part has recesses formed so as to be recessed in the facing orientation through the through holes from the outside to the inside of the pair of conductive members,
inner surfaces of the conductive members are exposed at the bottom of the recesses, and
portions around the through holes in the conductive members are curved inward in the facing orientation.

* * * * *